Sept. 16, 1924.  
C. W. SKINNER  
TRAP FILTER FOR IRRIGATION  
Filed April 27, 1923
1,508,480
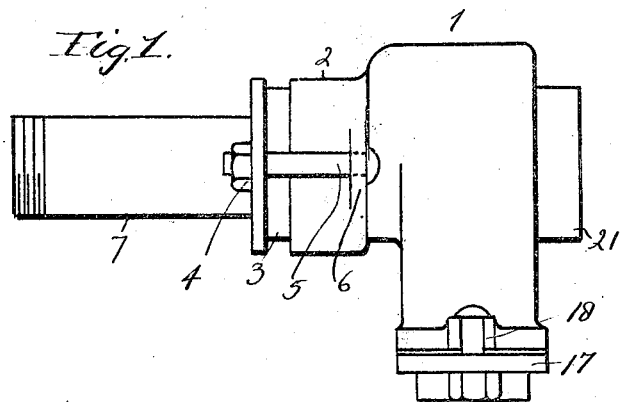
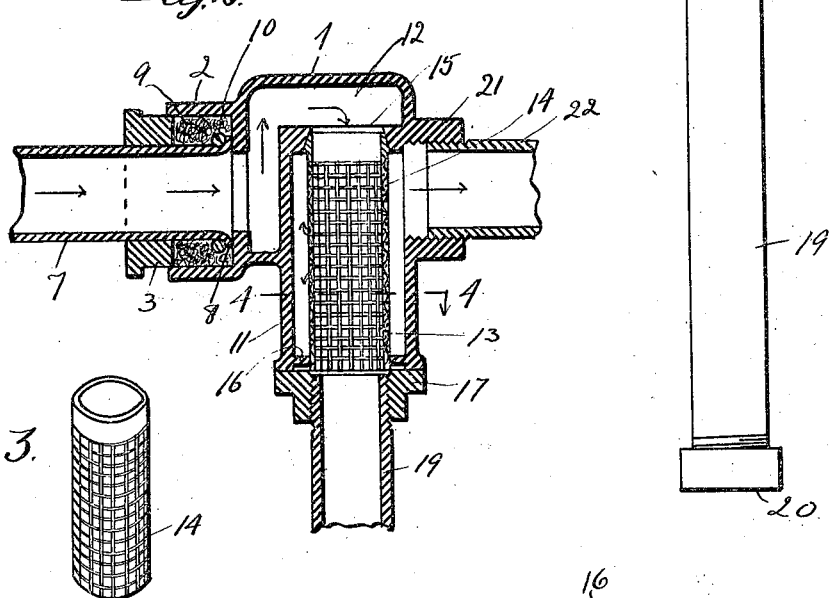
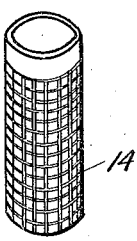
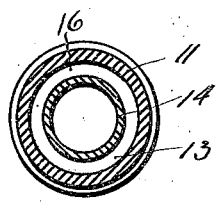
Inventor  
Charles W. Skinner  
By W. W. Williamson  
Atty.

Patented Sept. 16, 1924.

1,508,480

UNITED STATES PATENT OFFICE.

CHARLES W. SKINNER, OF NEWFIELD, NEW JERSEY.

TRAP FILTER FOR IRRIGATION.

Application filed April 27, 1923. Serial No. 634,960.

*To all whom it may concern:*

Be it known that I, CHARLES W. SKINNER, a citizen of the United States, residing at Newfield, in the county of Gloucester and State of New Jersey, have invented new and useful Improvements in a Trap Filter for Irrigation, of which the following is a specification.

My invention relates to a new and useful improvement in a trap filter for irrigation and the like, and has for its object to provide an exceedingly simple and effective construction and arrangement by which water passing through the main line or supply pipe may be conveyed to the sprinkler pipe free of any foreign matter which would be sufficient to clog the outlets of the sprinkling pipe.

A further object of my invention is to so construct the oscillating head and so place the filtering screen therein as to minimize the possibility of foreign matter of a size too large to pass through the said screen, adhering to the walls of said screen.

A still further object of my invention is to provide for cleansing the screen from any accumulations of foreign matter from time to time as occasion may require.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1 is a side elevation of a trap filter made in accordance with my improvement.

Fig. 2, is a vertical central section of a portion thereof showing the interior construction.

Fig. 3, is a detail perspective of the screen.

Fig. 4, is a section at the line 4—4 looking in the direction of the arrow.

1 represents the oscillating head having a stuffing box 2 formed therewith into which the stuffing gland 3 may be forced by the nuts 4 threaded on the outer ends of the bolts 5, but one of which is here shown, said bolts passing through the ears 6 projecting from the stuffing box 2.

7 represents the main line or supply pipe the inner end of which has a flange 8 formed thereon and this pipe passes through the gland 3 into the stuffing box and is there held against longitudinal movement by suitable packing 9, the pressure upon said packing being increased as occasion may require by setting up on the nuts 4. A metallic ring 10 is preferably placed against the flange 8 so that when the packing is compressed within the stuffing box the head may be oscillated about the pipe 7 without tearing or displacing the packing as will be readily understood.

11 represents a barrel which is formed with the head and has a portion thereof projecting into the chamber 12 formed in said head and the interior of this barrel is of such diameter as to leave a relatively large space 13 between its interior walls and the outer walls of the screen 14 when the latter is placed therein.

For convenience in placing the screen within the barrel and centering the same therein I provide an opening 15 in the inner end of the barrel, the walls of which opening are flared downward as clearly shown in Fig. 2 so that the screen, which is of tubular form, may be inserted within the space 13 and its outer end entering the opening 15 will be guided into a central position.

The lower end of the barrel has formed therein a circular flange 16 the opening through which is of sufficient diameter to permit the screen snugly to pass therethrough. When the screen is thus placed within the barrel it will be held against displacement by the flanged coupling 17 which is adapted to fit against the lower end of the barrel and be held in place by the flange bolts 18. The coupling 17 is interiorly threaded for the reception of a trap 19 the latter being here shown as in the form of a short pipe having a cap 20 threaded upon its lower end.

21 represents the outlet mouth of the head the interior of which communicates with the space 13 and the sprinkler pipe 22 is threaded into its mouth as clearly shown.

From the foregoing description it will be seen that water flowing through the supply pipe 7 passing into the chamber 12 will be caused to flow around and from the top of the barrel and down through the center of the screen. After which the water will pass through the openings in the screen reaching the space 13 in the barrel and from thence flow through the outlet mouth 21 to the sprinkler pipe 22 as clearly indicated by the arrow; and since the screen is normally standing approximately in a vertical position any foreign matter reaching the interior of the screen will tend to fall downward from the surface thereof into the trap 19 thus reducing to a minimum the liability of the screen becoming clogged during action.

After continued use should the screen become at all clogged it is only necessary to remove the cap 20 to permit water to flow downward through the screen and out through the trap thus scouring the interior surface of said screen.

Should it become desirable to remove the screen for any cause whatever this may be readily accomplished by removing the coupling 17 and withdrawing the screen from the barrel.

The arrangement of the stuffing relative to the supply pipe 7 facilitates the oscillation of the head and as the sprinkler pipe 22 is stationary upon said head the oscillations of the latter will determine the position of the outlets of the sprinkler pipe so that the jets of water may be directed at will.

Of course I do not wish to be limited to the exact details of construction as herein shown as these may be varied within the limits of the appended claims without departing from the spirit of my invention.

Having thus fully described my invention, what I claim as new and useful is:—

1. In combination with a main line or supply pipe of an irrigating system; a head so fitted upon the end of said main line as to be capable of oscillation; a barrel formed with the head and partly projecting in the latter; a chamber formed within the head communicating with the supply pipe; a tubular screen located within the barrel having its upper end in communication with the chamber; a coupling secured to the lower end of the barrel and adapted to hold the screen in place; a trap secured to said coupling, said trap being in a vertical line with said screen, and a sprinkler pipe communicating with the space surrounding said screen.

2. In a device of the character described; an oscillating head having a chamber formed therein, a barrel formed with said head; a portion of said barrel projecting into said chamber; the upper end of said barrel having an opening therethrough the walls of which are flared downward; a circular flange carried by the lower portion of the barrel and having an opening therethrough; a tubular screen adapted to pass through the opening in the flange to bring its upward end in contact with the flared walls of the first named opening; a coupling for holding said screen in place; means for securing said coupling to head; an interiorly threaded outlet mouth formed with the head and communicating with the interior of the barrel.

In testimony whereof, I have hereunto affixed my signature.

CHARLES W. SKINNER.